L. H. & A. YOUNG.
DUMP CART.
APPLICATION FILED FEB. 29, 1908.
938,198. Patented Oct. 26, 1909.
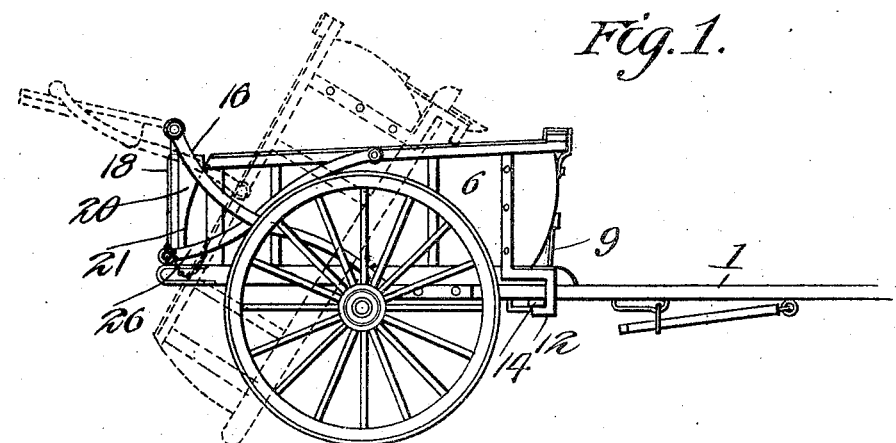
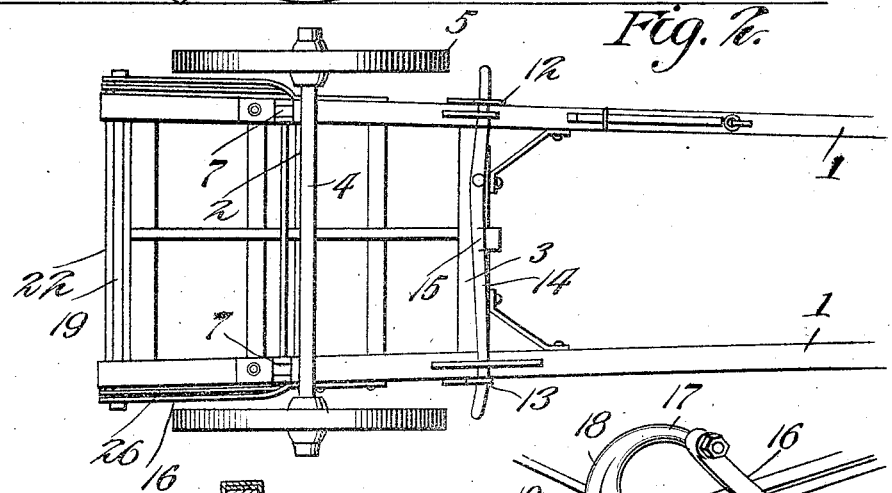
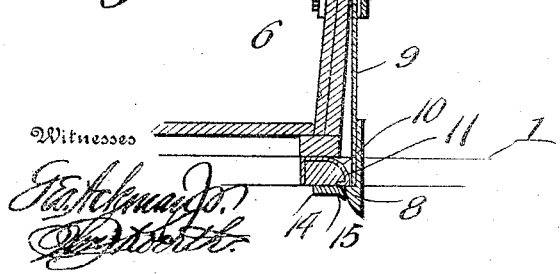
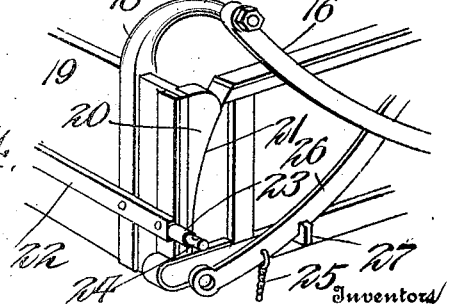
Witnesses
Inventors
Lorenzo H. Young
Adelaid Young
By Victor J. Evans
Attorney

UNITED STATES PATENT OFFICE.

LORENZO H. YOUNG AND ADELAID YOUNG, OF HAGERSTOWN, MARYLAND, ASSIGNORS OF ONE-FOURTH TO ARBRA ANDREW SCHULLER, OF HAGERSTOWN, MARYLAND.

DUMP-CART.

938,198.  Specification of Letters Patent.  Patented Oct. 26, 1909.

Application filed February 29, 1908. Serial No. 418,573.

*To all whom it may concern:*

Be it known that we, LORENZO H. YOUNG and ADELAID YOUNG, citizens of the United States, residing at Hagerstown, in the county of Washington and State of Maryland, have invented new and useful Improvements in Dump-Carts, of which the following is a specification.

This invention relates to an improvement in dump carts, of that class upon which we have received United States Letters Patent Number 835,999, dated November 13, 1906, and the object of the present invention is to provide improved mechanism for a dumping cart which will be automatically reset to retain the cart body in position when the body is swung backwardly automatically after the load is dumped.

Another object of the present invention is to provide the lower portion of the end gate with perforated trunnions adapted for the reception of pivoted arms or links, which may be readily removed from the trunnions to cause the end gate to act as a valve for regulating the dumping of only a quantity of the contents of the cart, or to act as a shield to prevent the contents of the cart being scattered rearwardly as the cart is dumped and to form means whereby the contents of the cart may be dumped into one compact pile.

With these and other objects in view the invention resides in the novel construction of elements and their arrangement in operative combination, hereinafter fully described and claimed.

In the accompanying drawings, Figure 1 is a side elevation of a cart constructed in accordance with our invention, illustrating the body of the cart dumped in dotted lines and the position of the end gate when the cart is dumped. Fig. 2 is a bottom plan view of the cart. Fig. 3 is a vertical section showing the latch mechanism and operating bar. Fig. 4 is a fragmentary perspective view of the connection of the end gate with the sides of the cart.

The frame of the vehicle comprises the shaft or thills 1, connected at their rear ends by the bolster 2 and in advance thereof by a cross bar 3. An axle 4 is suitably fixed beneath the bolster and carries the supporting wheels 5.

The body 6 is pivotally mounted upon the frame in rear of the bolster 2 as indicated at 7, the pivotal point being arranged slightly in rear of the transverse center of the body, as shown. The body is closed at its front end and open at its rear end and preferably increased gradually in depth toward the forward end, so that the weight of the load will be so distributed as to remove the strain upon the latch mechanism which holds the body in normal position. The latch mechanism comprises a beveled latch hook 8 carried by the spring arm 9, fixed at its upper end to the front of the body, said latch being adapted to engage a metallic keeper member 10 carried by the cross bar 3, said keeper member having a rounded face 11, over which the latch hook rides when moving into locking position.

The construction just described is substantially similar to that incorporated in our patent, but we have found, by experience, that the latch hook 8 does not serve as a thoroughly effective holding means when the cart is propelled over rough roads, and to assist the latch hook in securing the body of the cart in normal position, we have provided the sides of the cart with L-shaped hooks 12 and 13, having their open faces oppositely directed, so that a pivoted locking bar 14 being swung in one direction has both of its ends brought out of engagement with the L-shaped hooks, and when swung in the opposite direction is brought into engagement with the hooks. This lever 14 is pivoted to the under face of the cross bar 3 near one of the thills of the cart, and has its center provided with a rounded lip or surface 15, adapted to contact with the rounded face of the latch hook 8, when the lever 14 is swung upon its pivot, thus disengaging the latch hook from the keeper member 10, as well as swinging the lever 14 out of engagement with the L-shaped hooks, and allowing the body of the cart to swing upon its pivots as illustrated in the dotted lines of the drawings.

Fixed to the rear end of the shaft or thills 1 are supporting arms 16, which project upwardly and rearwardly and terminate at their upper ends above the rear end of the body. Said upper rear ends of the supporting arms are connected to the outwardly curved extensions 17, of bifurcated members 18, secured to and near each end of the end gate 19, thus providing means by which the end gate 19 is pivotally supported by the arms 16. The end gate 19 is adapted to close the rear of the body when the latter is in its normal position and is provided upon its ends with curved members 20, adapted to coact with the curved ends 21 of the sides of the cart to form a close joint to prevent the escaping of any of the load. The lower portion of the gate is provided with a transverse bar 22 having a trunnion or bearing 23, and provided with a reduced extension 24 provided with a vertical opening adapted for the reception of a pin carried by a flexible element 25, and supported by connecting links 26, having their upper ends pivotally connected with the sides of the cart and their lower ends provided with annular bearings adapted for engagement with the trunnion 23, and to be retained in position upon the trunnion by the pin engaging the flexible element 25 being fitted within the vertical opening of the extension 24. By this arrangement, it will be seen that when the cart is dumped the end gate will assume the position illustrated in the dotted lines of Fig. 1, but it is desirable at times to open the gate without the necessity of dumping the cart or to have the gate 19 only open partially, to serve as a valve for distributing the load along the path of the cart, or to act as a deflector whereby the load is deposited in a small pile when the cart is dumped. When these conditions are desirable, the link 26 is removed from its connection with the trunnion 23, and the link allowed to rest in bearings 27, provided upon the lower portions of each side of the cart.

From the above description it will be noted that our improved cart will allow the end gate to be raised above the body of the cart as the load is dumped or will allow the end gate to be opened manually at any desired distance from the end of the cart. It will be further noted that when the body of the cart returns to normal position the latch hook 8 riding over the keeper member 10 will contact the face 15 of the lever 14, and force the lever to turn upon its pivot and engage beneath the faces of the hooks 12 and 13, thus automatically locking the cart upon the thills and securely retaining the cart in locked position. It will be still further noted that the ends of the lever 14 are adapted to project upon either side of the thills 1, and that the cart can be readily dumped from either side by simply grasping the projecting end of the lever and turning it upon its pivot so as to disengage the latch hook from the keeper member and the ends of the lever 14 from the hooks 12 and 13.

Having thus fully described the invention what is claimed as new is:

In a dump cart, thills provided with a cross connecting bar L-shaped hook members upon the sides of the cart, an eccentrically pivoted lever upon the cross bar of the thills, a spring catch connected with the body of the cart adapted to contact and spring the lever into engagement with the hooks and to engage beneath the cross bar of the thills when the cart is swung upon the bolster.

In testimony whereof we affix our signatures in presence of two witnesses.

LORENZO H. YOUNG.
ADELAID YOUNG.

Witnesses:
LEWIS STONEBRAKER,
G. I. ANDERSON.